US010704615B2

(12) United States Patent
Gittins et al.

(10) Patent No.: US 10,704,615 B2
(45) Date of Patent: Jul. 7, 2020

(54) VEHICLE AND SYSTEM FOR CONTROLLING A VEHICLE TRANSMISSION

(71) Applicant: FORD GLOBAL TECHNOLOGIES, LLC, Dearborn, MI (US)

(72) Inventors: Scott Joseph Gittins, Ann Arbor, MI (US); Timothy Fedullo, Northville, MI (US); Samuel Melville Glauber, Northville, MI (US); Andrew James Myrna, Royal Oak, MI (US); Benjamin Rupley, Westland, MI (US); Ryan Eggebrecht, Merrill, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 16/107,441

(22) Filed: Aug. 21, 2018

(65) Prior Publication Data

US 2020/0063805 A1  Feb. 27, 2020

(51) Int. Cl.
*F16D 48/02* (2006.01)
*F16D 48/06* (2006.01)
*F16H 61/06* (2006.01)
*F16H 61/00* (2006.01)

(52) U.S. Cl.
CPC ......... *F16D 25/14* (2013.01); *F16D 48/0206* (2013.01); *F16D 48/066* (2013.01); *F16H 61/067* (2013.01); *F16D 2500/1026* (2013.01); *F16D 2500/3024* (2013.01); *F16D 2500/5018* (2013.01); *F16H 2061/0034* (2013.01)

(58) Field of Classification Search
None
See application file for complete search history.

(56) References Cited

U.S. PATENT DOCUMENTS

| | | | |
|---|---|---|---|
| 6,504,474 B1 | 1/2003 | Goodnight et al. | |
| 6,942,055 B2 * | 9/2005 | Forsyth | B60K 17/34 180/249 |
| 6,973,781 B2 * | 12/2005 | Brown | F15B 1/024 417/16 |
| 8,050,828 B2 | 11/2011 | Dlugoss et al. | |
| 8,375,710 B2 * | 2/2013 | Mellet | F16H 61/0021 60/329 |
| 8,678,780 B2 * | 3/2014 | Dougan | F16H 61/0021 192/3.58 |
| 8,826,655 B2 * | 9/2014 | Neuner | F16H 61/0021 60/413 |
| 8,855,878 B2 | 10/2014 | Otanez et al. | |
| 9,383,009 B2 * | 7/2016 | Lundberg | F16H 61/0031 |
| 9,618,014 B2 * | 4/2017 | Morris | F02N 7/08 |
| 9,989,042 B2 * | 6/2018 | Hoxie | F04B 17/05 |
| 2013/0263948 A1 * | 10/2013 | Block | F15B 1/027 137/624.27 |
| 2014/0207350 A1 | 7/2014 | Dix et al. | |

* cited by examiner

*Primary Examiner* — Dirk Wright
(74) *Attorney, Agent, or Firm* — Vincent Mastrogiacomo; Brooks Kushman P.C.

(57) ABSTRACT

A vehicle includes an engine, a transmission, and a controller. The transmission has clutches, a circuit configured to transport fluid to the clutches, a pump configured to circulate the fluid through the circuit, and an accumulator disposed along the circuit. The controller is programmed to, responsive to an engine start and a fluid temperature being less than a temperature threshold, discharge the accumulator to prime the pump.

18 Claims, 3 Drawing Sheets

VEHICLE AND SYSTEM FOR CONTROLLING A VEHICLE TRANSMISSION

TECHNICAL FIELD

The present disclosure relates to vehicles and a system of controlling a vehicle transmission.

BACKGROUND

Vehicle transmissions include fluid pumps that supply transmission fluid to clutches within the transmission to engage or disengage the clutches in order to establish multiple gear ratios between an input and an output of the transmission. The pumps may also supply transmission fluid to the contact surfaces of moving parts within the transmission to provide lubrication.

SUMMARY

A vehicle includes an engine, a transmission, and a controller. The transmission includes clutches, a circuit configured to transport fluid to the clutches, a pump configured to circulate the fluid through the circuit, and an accumulator disposed along the circuit. The controller is programmed to, responsive to starting the engine, a fluid temperature being less than a temperature threshold, and a fluid pressure being less than a pressure threshold, discharge the accumulator to prime the pump.

A vehicle includes an engine, a transmission, and a controller. The transmission has clutches, a circuit configured to transport fluid to the clutches, a pump configured to circulate the fluid through the circuit, and an accumulator disposed along the circuit. The controller is programmed to, responsive to an engine start and a fluid temperature being less than a temperature threshold, discharge the accumulator to prime the pump.

A vehicle includes an engine, a transmission, and a controller. The transmission includes a circuit, a pump configured to circulate the fluid through the circuit, and an accumulator disposed along the circuit. The controller is programmed to, responsive to a current engine start, a time period between the current engine start and a prior engine start being greater than a time threshold, and a fluid temperature being less than a temperature threshold, discharge the accumulator to prime the pump.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
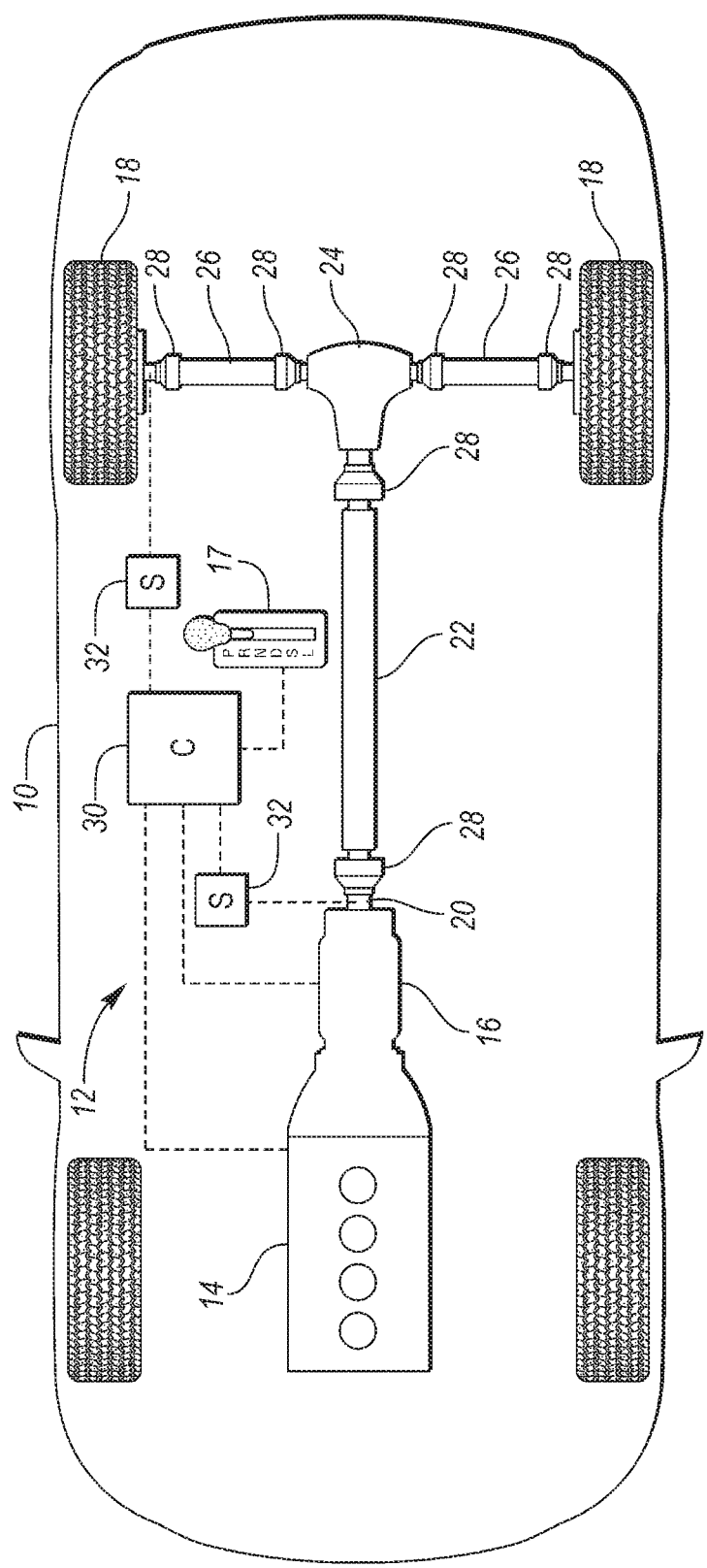
FIG. 1 is a schematic diagram representative of a vehicle and a vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 includes an engine 14 and a transmission 16. The transmission 16 may be configured to provide multiple gear ratios between an input and an output of the transmission 16. The transmission 16 may be placed in PRNDSL (park, reverse, neutral, drive, sport, or low gear) via a transmission range selector 17. The transmission range selector 17 may include mechanical linkages that transition the transmission 16 between the various gears (i.e., PRNDSL). Alternatively, the transmission 16 may be a shift-by-wire transmission were the transmission range selector 17 communicates with the transmission 16 via a wired or wireless connection via the controller 30 in order to transition the transmission 16 between the various gears. The engine 14 is connected to the input of the transmission 16 while drivetrain components that are configured deliver power to driving wheels 18 are connected to an output shaft 20 of the transmission 16. The engine 14 may be connected to the input of the transmission by a torque converter or a launch clutch. More specifically, the output shaft 20 of the transmission 16 may be connected to a driveshaft 22. The driveshaft 22 may then be connected to a differential 24. The differential may then be connected to the driving wheels 18 by half shafts 26. The various components of the powertrain 12, including the output shaft 20 of the transmission 26, driveshaft 22, differential 24, half shafts 26 and driving wheels 18, may be connected to each other via constant-velocity joints 28.

The powertrain 12 further includes an associated controller 30 such as a powertrain control unit (PCU). While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions such as starting/stopping the engine 14, the amount power or torque being generated by the engine 14, operating an electric machine such as a motor/generator to provide wheel torque or charge a battery (in hybrid or electric vehicles), select or schedule shifts of the transmission 16, transition the transmission 16 to the desired gear based on an input from a gear selector, open/close an engine disconnect clutch (in vehicles where the engine may be disconnected from the powertrain), etc. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the engine 14 or vehicle 10.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The vehicle 10 may also include speed sensors 32 that are configured to communicate the current speed of the vehicle 10 to the controller 30. The speed sensors 32 may be configured to detect the rotational speed of the wheels (including the driving wheels 18 and the non-driving wheels), which in turn may be converted into the linear speed of the vehicle 10 by an algorithm stored in the controller 30. The vehicle speed may be based on a measured rotational speed of one wheel or may be an average of the measured rotational speeds of multiple wheels. Alternatively, a single speed sensor 32 may be configured to detect the rotational speed of the output shaft 20 of the transmission 16. The vehicle speed may be based on the measured rotational speed of the output shaft 20, which in turn may be converted into the linear speed of the vehicle 10 by an algorithm stored in the controller, taking into account the gearing ratio between the output of the transmission 16 and the driving wheels 18.

Figure 3:
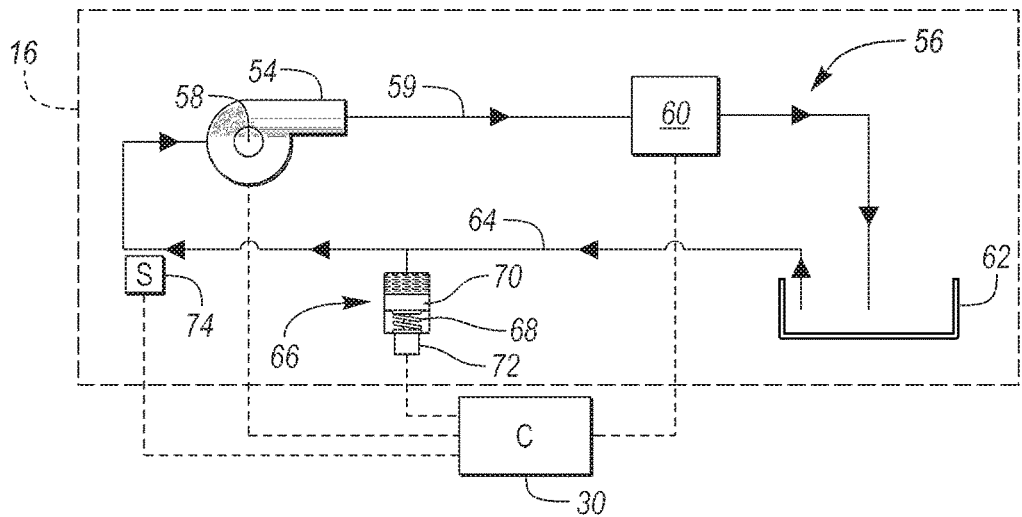
FIG. 3 is a schematic diagram representative of hydraulic fluid system in the vehicle transmission.

The controller 30 may be configured to receive various states or conditions of the various vehicle components illustrated in FIGS. 1 and 3 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

The input channels and output channels are illustrated as dotted lines in FIGS. 1 and 3. It should be understood that a single dotted line may be representative of both an input channel and an output channel into or out of a single element. Furthermore, an output channel into one element may operate as an input channel to another element and vice versa.

The driving wheels 18 depicted in FIG. 1 are shown as rear wheels of the vehicle 10. However, it should be understood that the front wheels may also be driving wheels. For example, the front wheels may be connected to the transmission 16 through a series of drivetrain components such as driveshafts, half shafts, differentials, transfer cases, constant-velocity joints, etc. in a manner similar to how the rear wheels are connected to the transmission 16, but not necessarily in the same order or configuration. Furthermore, although an engine 14 is shown to be the power generating component of the powertrain 12, other power generating components (i.e., electric motors or fuel cells) may be used in place of or in addition to (such as with hybrid vehicles) the engine 14.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

A group of elements (gears, shafts, etc.) are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a housing may be called a brake.

Clutches may be engaged when hydraulic fluid or an actuator (e.g., electrical motor or solenoid) forces a piston into contact with a clutch pack, consisting of alternating friction plates and separator plates. The friction plates may be fixed to a first rotating element while the separator plates are fixed to a second rotating element, or vice versa. Alternatively, the friction plates may be connected to a first rotating element while the separator plates are grounded to a housing or case (e.g., a transmission case), or vice versa. In this alternative configuration, where either the friction plates or separator plates are grounded to a case, a clutch may be referred to as a brake.

Figure 2:
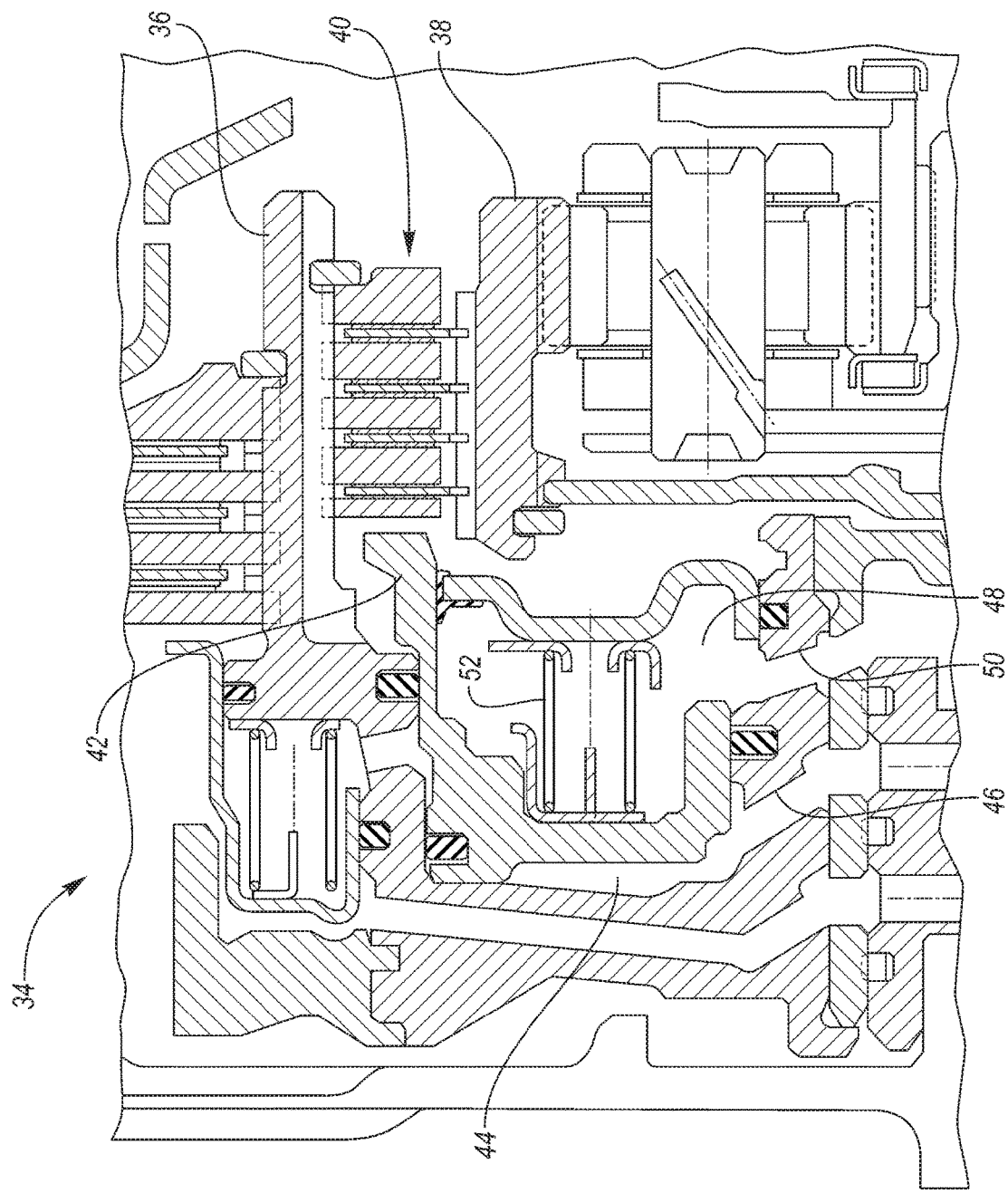
FIG. 2 is a cross-sectional view representative of a clutch in a vehicle transmission.

Referring to FIG. 2, a cross-sectional view representative of a clutch 34 located in the transmission 16 is illustrated. More specifically, the clutch 34 is a hydraulic clutch. The clutch 34 is configured to selectively couple a first rotating element 36 to a second rotating element 38. The clutch 34 includes a clutch pack 40 that includes friction plates and separator plates that are fixedly coupled, in an alternating configuration, to either the first rotating element 36 or the second rotating element 38. A piston 42 is configured to engage and disengage the clutch pack 40 in order to couple and decouple the first rotating element 36 to and from the second rotating element 38. The piston 42 engages the clutch pack 40 when high pressure hydraulic fluid is directed into a chamber 44 located on an apply side of the piston 42. The high pressure hydraulic fluid may be directed into the chamber 44 through a first channel 46 that is connected to a high pressure fluid circuit of the transmission 16. Low pressure hydraulic fluid may also be directed into a balancing dam chamber 48 located on the opposing side of the piston relative to the chamber 44 located on the apply side of the piston 42. The low pressure hydraulic fluid may be directed into the balancing dam chamber 48 through a second channel 50 that is connected to a low pressure fluid circuit of the transmission 16. A balance dam creates a centrifugal hydraulic pressure that opposes and balances centrifugal hydraulic pressure developed in the chamber 44 located on the apply side of the piston 42. These centrifugal pressures are caused by rotation of the components of the clutch 42. Directing hydraulic fluid into the balance dam chamber 48 eliminates or reduces the pressure effects caused by the speed of rotation so that the control system pressure (i.e., the hydraulic pressure commanded to the chamber 44 located on the apply side of the piston 42) alone creates the necessary force for the piston 42 to engage the clutch pack 40. A compression spring 52 is configured to disengage the piston 42 from the clutch pack 40 when hydraulic fluid is vented from the chamber 44 located on the apply side of the piston 42. The hydraulic fluid may also be vented from the balancing dam chamber 48 while engaging the piston 42 and the clutch pack 40.

Referring to FIG. 3, a schematic diagram representative of a hydraulic fluid system in the vehicle transmission 16 is illustrated. The transmission 16 includes a pump 54 that is configured to supply hydraulic fluid to and circulate hydraulic fluid through a fluid circuit 56. The pump 54 may be driven by an input 58 to the transmission (e.g., a crankshaft of the engine 14 or a rotor of an electric motor in electric or hybrid vehicles). The pump 54 may be indirectly driven by the input 58 to the transmission 16 by a chain, belt, or series of gears.

The hydraulic fluid circuit 56 includes a feed line 59 that supplies or transports hydraulic fluid from the pump 54 to one or more clutches 60 in the transmission 16 in order to engage the one or more clutches 60. The feed line 59 may be representative of one or more feed lines that deliver pressurized hydraulic fluid to the one or more clutches 60. The clutches 60 may include similar corresponding components and may be engaged/disengaged in the same manner as clutch 34 as described above. For example, an individual clutch may be engaged when the hydraulic fluid is directed into a chamber located on supply side of an individual clutch forcing a piston into contact with a clutch pack.

The transmission 16 may also include a sump 62. Hydraulic fluid may be configured to flow from the clutches 60 when transitioning from engaged to disengaged conditions and into the sump 62. More specifically, hydraulic fluid may be configured to flow from the chamber located on the apply side of the clutch and into the sump 62 when an individual clutch disengages. Also, hydraulic fluid may be configured to flow from balance dam chambers (i.e., the chamber on the opposing side of a clutch piston relative to the apply side of the clutch) of a specific clutch and into the sump 62 while the clutch is engaging. Hydraulic fluid may further be configured to flow from the lubrication points within the transmission 16 and into the sump 62. The sump 62 may be located at a low position within the transmission 16 such that hydraulic fluid is directed into the sump 62 via gravity. The hydraulic fluid circuit 56 further includes a supply line 64 that extends from the sump 62 to the pump 54. The pump 54 is configured to draw hydraulic fluid from the sump 62 via the supply line 64 in order to supply hydraulic fluid to the hydraulic fluid circuit 56 and ultimately to the one or more clutches 60.

The hydraulic fluid circuit 56 may also include a fluid accumulator 66 that is configured to store excess hydraulic fluid and equalize the pressure within the hydraulic fluid circuit 56. The fluid accumulator 66 may include a spring 68 or some other mechanism (such as a compressed gas chamber) that provides a force on a first side of a piston 70 of the accumulator 66 in order to maintain a compressive force on the hydraulic fluid in the fluid circuit 56 (the hydraulic fluid being exposed to a second side of the piston 70 that is opposed the first side of the piston 70). An actuator 72, such as an electric motor or electric solenoid, may be connected to the piston 70. The actuator 72 may be configured to adjust the position of the piston 70 in order to discharge additional hydraulic fluid into or increase the pressure within the hydraulic fluid circuit 56. One or more sensors 74 that determine the pressure and/or temperature of the hydraulic fluid within the fluid circuit 56 may be configured to communicate the pressure and/or temperature of the hydraulic fluid to the controller 30.

The accumulator 66 may disposed along a portion of the fluid circuit 56 that is upstream of an inlet to the pump 54 (i.e., along the supply line 64) such that discharging the accumulator functions to prime the pump 54 (i.e., fill the pump 54 with hydraulic fluid). In the event that the pump 54 is being deprived of hydraulic fluid, it may be necessary to prime the pump 54 in order to ensure the one or more clutches 60 are supplied with hydraulic fluid for engagement/disengagement purposes. Additionally, if the transmission is a shift-by-wire transmission, where the transmission range selector 17 shifts the transmission 16 between PRNDSL via a wired or wireless connection, pressurized hydraulic is required to move a parking pawl within the transmission 16 to transition the transmission out of the parked (P) gear.

Line pressure instability and/or starving the pump 54 of hydraulic fluid may occur when the hydraulic fluid pressure is low (e.g., when hydraulic fluid temperature is at or less than −25° C.), when the vehicle has been shut down for an extended period of time, and/or under any other condition where that may lead to a decrease in the hydraulic fluid pressure. In order to alleviate the line pressure instability and/or the starvation of the pump 54, the rotational speed of the engine 14 may be increased to rotate the pump 54 at a higher speed in order to increase the pressure of the hydraulic fluid, the operator may let the engine 14 idle for a period of time to increase the hydraulic fluid temperature, and/or the accumulator 66 may be discharged. Increasing engine speed will increase emissions and decrease fuel economy. Allowing the engine 14 to idle will also increase emissions and decrease fuel economy, while also delaying the operator from immediately using the vehicle 10 for travel purposes. Discharging the accumulator 66, on the other hand, will immediately alleviate the line pressure instability and/or the starvation of the pump 54 without increasing emissions, without decreasing fuel economy, and without delaying the operator from using the vehicle 10 for travel purposes.

The controller 30 may be configured to adjust various states of certain transmission components in response to various conditions of the transmission 16. For example, the controller 30 may be in communication with and configured to control the pump 54, clutches 60, accumulator 66, etc. The controller 30 may be configured to engage and disengage the one or more clutches 60 by opening and closing valves (not shown) to direct fluid into and out of the chambers located on the apply side of each clutch and the balancing dam chambers of each clutch. The controller may engage or disengage individual clutches based on a shift schedule, operator input, or any other condition requiring the engagement or disengagement of an individual clutch. The controller 30 may also be configured activate the accumulator 66 (via the actuator 72) to discharge hydraulic fluid into the high pressure hydraulic fluid circuit 56.

Figure 4:
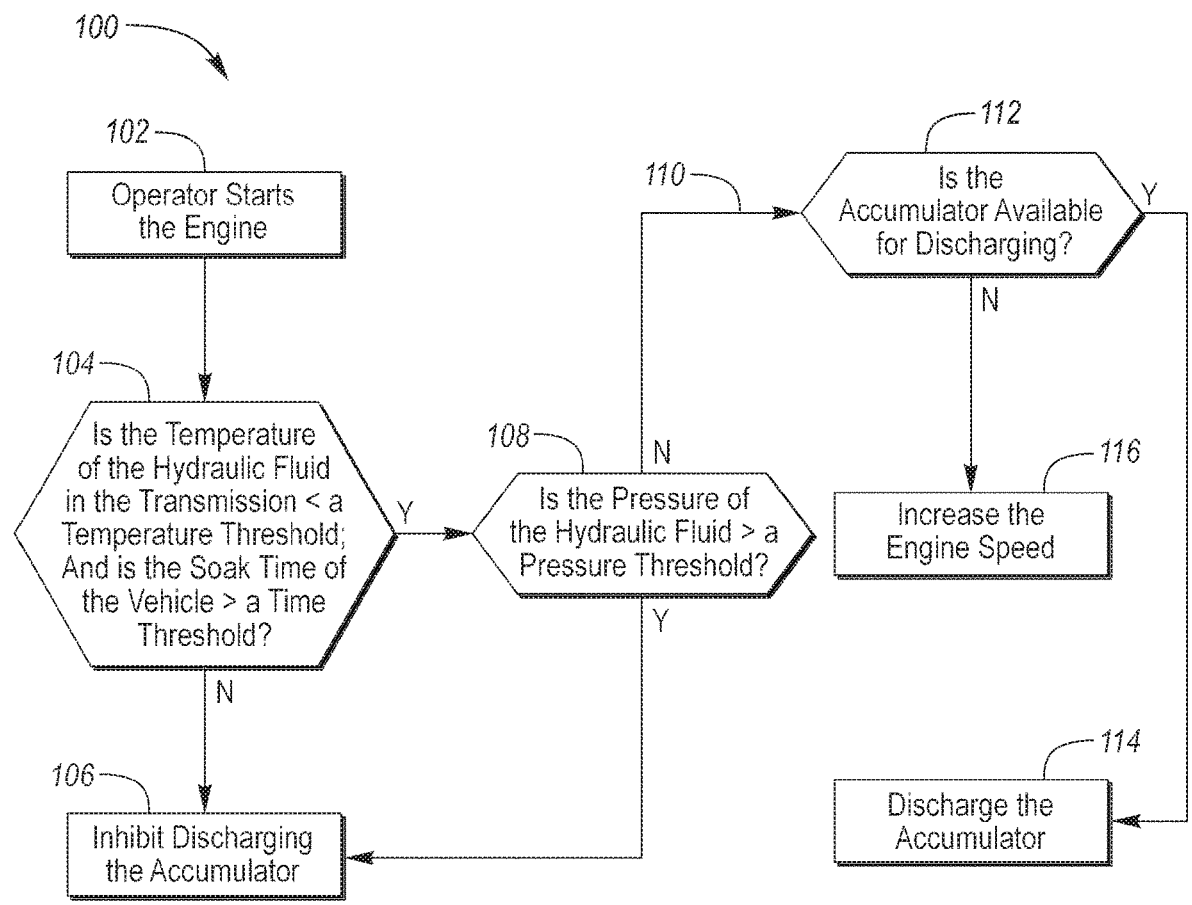
FIG. 4 is a flowchart illustrating a method of controlling the flow of hydraulic fluid in the vehicle transmission.

Referring to FIG. 4, a method 100 of controlling the flow of hydraulic fluid in the vehicle transmission 16 is illustrated. The method 100 may be stored as control logic and/or an algorithm within the controller 30. The controller 30 may implement the method 100 by controlling the various components of the vehicle 10. The method 100 is initiated at block 102, when the operator of the vehicle 10 starts the engine 14. The method 100 then moves on to block 104. The method 100 may immediately move on to block 104 from block 102 upon initiation of the engine start (i.e., during a cranking period of the engine 14) or may move on to block 104 from block 102 only after it is verified that the engine 14 was successfully started (i.e., the engine 14 has obtained some minimum operating or idle speed indicative that the engine is being supplied with fuel and that combustion of the fuel occurring). At block 104, it is determined if the temperature of the hydraulic fluid in the transmission 16 is less than a temperature threshold. Alternatively, or in additional to determining if the temperature of the hydraulic fluid in the transmission 16 is less than a temperature threshold, block 104 may determine if the soak time of the vehicle 10 (i.e., a time period between a current engine start and a previous engine start) is greater than a time threshold.

If the temperature of the hydraulic fluid is not less than (e.g., is greater than) the temperature threshold and/or if the soak time of the vehicle 10 is not greater than (e.g., is less than) the time threshold, the method 100 moves on to block 106, where the accumulator is inhibited from discharging. If the temperature of the hydraulic fluid is less than the temperature threshold and/or if the soak time of the vehicle 10 is greater than the time threshold, the method 100 moves on to block 108 where it is determined if the pressure of the hydraulic fluid in the transmission 16 is greater than a pressure threshold. If the pressure of the hydraulic fluid in the transmission 16 is greater than the pressure threshold, the method 100 moves on to block 106, where the accumulator is inhibited from discharging. If the pressure of the hydraulic fluid in the transmission 16 is not greater (e.g., is less than) than the pressure threshold, the method 100 issues a request to discharge the accumulator (illustrated by line and arrow 110) in order to prime the pump 54. The request to discharge the accumulator 110 is sent to block 112 where it is determined if the accumulator 66 is available for discharging. The accumulator 66 may not be available for discharge if the accumulator 66 is in an inoperable condition (e.g., the accumulator 66 has been damaged, has malfunction, is not responding to control signals from the controller 30, a fluid volume within the accumulator 66 has not been recharged to a desired level and is below a volume threshold after a recent discharge, etc.).

If the accumulator 66 is available for discharging, the method moves onto block 114, where the accumulator 66 is discharged to prime the pump 54. If the accumulator 66 is not available for discharging, the method 100 moves onto block 116, where the speed of the engine 14 is increased, which increases the speed of the pump 54, in order to prime the pump 54. Increasing the speed of the pump 54 also increases the pressure of the hydraulic fluid in the transmission 16. The speed of the engine 14 may be increased from an idle speed at block 116. The speed of the engine 14 may remain at the increased speed at block 116 until the pressure of the hydraulic fluid in the transmission 16 increases to a value that is greater than the pressure threshold of block 108. Once the hydraulic fluid in the transmission 16 increases to a value that is greater than the pressure threshold at block 108, the speed of the engine 14 may then be reduced to an idle speed from the increased speed.

In an alternative embodiment, block 108 may be eliminated and block 104 may generate the request to discharge the accumulator 110, which is then input into block 112, in response to the temperature of the hydraulic fluid being less than the temperature threshold and/or in response to the soak time of the vehicle 10 being greater than the time threshold. In yet another alternate embodiment, blocks 108, 112, and 116 may be eliminated and block 104 may generate the request to discharge the accumulator 110, which is then input into block 114, in response to the temperature of the hydraulic fluid being less than the temperature threshold and/or in response to the soak time of the vehicle 10 being greater than the time threshold. It should be understood that the flowchart in FIG. 4 is for illustrative purposes only and that the method 100 should not be construed as limited to the flowchart in FIG. 4. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an engine;

a transmission having clutches, a circuit configured to transport fluid to the clutches, a pump configured to circulate the fluid through the circuit, and an accumulator disposed along the circuit; and a controller programmed to, responsive to starting the engine, a fluid temperature being less than a temperature threshold, and a fluid pressure being less than a pressure threshold, discharge the accumulator to prime the pump, and responsive to, a request to discharge the accumulator and a fluid volume within the accumulator being less than a volume threshold, increase an engine speed.

2. The vehicle of claim 1, wherein the controller is further programmed to, responsive to a time period between a current engine start and a previous engine start being less than a time threshold, inhibit discharging the accumulator to prime the pump.

3. The vehicle of claim 1, wherein the controller is further programmed to, responsive to, a request to discharge the accumulator and an inoperable condition of the accumulator, increase an engine speed.

4. The vehicle of claim 1, wherein the accumulator is disposed along the circuit upstream of an inlet to the pump.

5. A vehicle comprising:

an engine;

a transmission having clutches, a circuit configured to transport fluid to the clutches, a pump configured to circulate the fluid through the circuit, and an accumulator disposed along the circuit; and a controller programmed to, responsive to an engine start and a fluid temperature being less than a temperature threshold, discharge the accumulator to prime the pump, and responsive to, a request to discharge the accumulator and an inoperable condition of the accumulator, increase an engine speed from an idle speed.

6. The vehicle of claim 5, wherein the controller is further programmed to, responsive to a fluid pressure being greater than a pressure threshold, inhibit discharging the accumulator to prime the pump.

7. The vehicle of claim 5, wherein the controller is further programmed to, responsive to a time period between a current engine start and a previous engine start being less than a time threshold, inhibit discharging the accumulator to prime the pump.

8. The vehicle of claim 5, wherein the controller is further programmed to, responsive to, a fluid pressure increasing to greater than a pressure threshold while the engine is operating at the increased speed, decrease the engine speed from the increased speed to the idle speed.

9. The vehicle of claim 5, wherein the controller is further programmed to, responsive to, a request to discharge the accumulator and a fluid volume within the accumulator being less than a volume threshold, increase an engine speed.

10. The vehicle of claim 9, Wherein the controller is further programmed to, responsive to, a fluid pressure increasing to greater than a pressure threshold while the engine is operating at the increased speed, decrease the engine speed from the increased speed to the idle speed.

11. The vehicle of claim 5, wherein the accumulator is disposed along the circuit upstream of an inlet to the pump.

12. The vehicle of claim 5, wherein the pump is driven by a transmission input.

13. A vehicle comprising:

an engine;

a transmission having a circuit, a pump configured to circulate fluid through the circuit, and an accumulator disposed along the circuit; and a controller programmed to, responsive to a current engine start, a time period between the current engine start and a prior engine start being greater than a time threshold, and a fluid temperature being less than a temperature threshold, discharge the accumulator to prime the pump.

14. The vehicle of claim 13, wherein the controller is further programmed to, responsive to a fluid pressure being greater than a pressure threshold, inhibit discharging the accumulator to prime the pump.

15. The vehicle of claim 14, wherein the controller is further programmed to, responsive to the fluid pressure being less than the pressure threshold, the engine start, and the fluid temperature being less than the temperature threshold, discharge the accumulator to prime the pump.

16. The vehicle of claim 13, wherein the controller is further programmed to, responsive to, a request to discharge the accumulator and an inoperable condition of the accumulator, increase an engine speed.

17. The vehicle of claim 13, wherein the controller is further programmed to, responsive to, a request to discharge the accumulator and a fluid volume within the accumulator being less than a volume threshold, increase an engine speed.

18. The vehicle of claim 13, wherein the accumulator is disposed along the circuit upstream of an inlet to the pump.

* * * * *